United States Patent
Quan et al.

(10) Patent No.: US 9,730,189 B2
(45) Date of Patent: Aug. 8, 2017

(54) ACCESSING METHOD, EQUIPMENT AND BASE STATION

(71) Applicant: Huawei Technologies Co., Ltd., Shenzhen (CN)

(72) Inventors: Wei Quan, Shenzhen (CN); Jian Zhang, Shenzhen (CN); Yi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 14/620,909

(22) Filed: Feb. 12, 2015

(65) Prior Publication Data

US 2015/0156750 A1 Jun. 4, 2015

Related U.S. Application Data

(63) Continuation of application No. PCT/CN2012/080478, filed on Aug. 22, 2012.

(51) Int. Cl.
*H04W 72/04* (2009.01)
*H04W 56/00* (2009.01)
*H04W 48/08* (2009.01)
*H04W 74/08* (2009.01)

(52) U.S. Cl.
CPC ............ *H04W 72/04* (2013.01); *H04W 48/08* (2013.01); *H04W 56/0045* (2013.01); *H04W 74/0833* (2013.01)

(58) Field of Classification Search
CPC . H04W 72/04; H04W 48/08; H04W 56/0045; H04W 74/08
See application file for complete search history.

(56) References Cited

U.S. PATENT DOCUMENTS

| | | | |
|---|---|---|---|
| 2007/0149206 A1* | 6/2007 | Wang | H04W 36/0077 455/450 |
| 2008/0225796 A1* | 9/2008 | Malladi | H04W 72/1284 370/331 |
| 2009/0141700 A1 | 6/2009 | Baldemair et al. | |
| 2010/0254356 A1* | 10/2010 | Tynderfeldt | H04W 56/0005 370/336 |
| 2011/0171949 A1* | 7/2011 | Liao | H04W 56/0015 455/422.1 |

(Continued)

FOREIGN PATENT DOCUMENTS

| | | |
|---|---|---|
| CN | 101198151 A | 6/2008 |
| CN | 101513099 A | 8/2009 |

(Continued)

*Primary Examiner* — Ronald B Abelson
(74) *Attorney, Agent, or Firm* — Leydig, Voit & Mayer, Ltd.

(57) ABSTRACT

Embodiments of the present invention provide an access method, a user equipment and a base station. In the present invention, a user equipment obtains a first synchronous channel resource; uses the first synchronous channel resource to send an access request to a base station, for requesting to access the base station; receives access feedback sent by the base station, and determining whether access is successful according to the access feedback. In this way, occupation of the user equipment on an access resource during access may be reduced, and utilization efficiency of the access resource is improved.

13 Claims, 6 Drawing Sheets

(56) References Cited

U.S. PATENT DOCUMENTS

| | | | |
|---|---|---|---|
| 2011/0280212 A1* | 11/2011 | Lv | H04W 74/002 |
| | | | 370/329 |
| 2012/0182986 A1* | 7/2012 | Sebire | H04W 56/00 |
| | | | 370/343 |
| 2012/0188986 A1 | 7/2012 | Kawasaki et al. | |

FOREIGN PATENT DOCUMENTS

| | | |
|---|---|---|
| CN | 101583187 A | 11/2009 |
| CN | 101772131 A | 7/2010 |
| CN | 101772184 A | 7/2010 |
| CN | 102123516 A | 7/2011 |
| CN | 102123519 A | 7/2011 |
| EP | 2693826 A1 | 2/2014 |

* cited by examiner

ACCESSING METHOD, EQUIPMENT AND BASE STATION

CROSS-REFERENCE TO RELATED APPLICATIONS

This application is a continuation of International Patent Application No. PCT/CN2012/080478, filed on Aug. 22, 2012, which is hereby incorporated by reference in its entirety.

TECHNICAL FIELD

The present invention relates to the field of communication technology field, and more particularly to an accessing method, equipment and base station.

BACKGROUND

In a communication system, air interface transmission has time delay. In order to ensure that uplink signals sent by a user equipment (User Equipment, UE) under a base station may arrive at the base station synchronously, the UE needs to obtain a timing advance (Timing Advance, TA) value before accessing to a cell to transmit uplink data, so that when performing uplink transmission at the cell, the user equipment always sends the uplink signals ahead of the TA to enable the uplink data to arrive at the base station at an appointed time. With moving of the user equipment, the TA value corresponding to a serving base station of the user equipment will change. The base station uses a TA command to inform the user equipment to change the TA value. A change value of the TA is carried in the TA command, for enabling the user equipment to correct the TA after receiving the change value of the TA. Meanwhile, the user equipment will set a timing alignment timer (Timing Alignment Timer, TAT) for maintaining whether the TA value is available. In the case of TAT overtime, the user equipment considers that the TA value may be unreliable, and then the user equipment considers that uplink is unreliable and needs to acquire the TA value again.

In a long term evolution (Long Term Evolution, LTE) system, the user equipment obtains uplink synchronization, namely, obtains the above-mentioned TA value, through a random access procedure (Random Access Procedure). The random access procedure is divided into two types, random access based on competition and random access based on non-competition.

In order to overcome uplink asynchronization, during the random access procedure, the user equipment performs random access by using a random access code. In order to avoid interference generated by an asynchronous user equipment, a physical random access channel (Physical Random Access Channel, PRACH) bearing the random access code needs more guard time (Guard Time), thus resulting in large resource occupation of the physical random access channel.

For the synchronized user equipment, when an uplink resource is requested, if the above-mentioned random access procedure is stilled used, the access resource will be wasted.

SUMMARY

Embodiments of the present invention provide an access method, a user equipment and a base station, for solving waste phenomenon of an access resource in a random access procedure in the prior art, reducing the occupation of a UE on the access resource during access and improving the utilization efficiency of the access resource.

In the first aspect, the embodiments of the present invention provide an access method, including: obtaining, by a user equipment, a first synchronous channel resource; using the first synchronous channel resource to send an access request to a base station, for requesting to access the base station; receiving access feedback sent by the base station, and determining whether access is successful according to the access feedback.

In combination with the first aspect, in the first possible implementation manner, the obtaining a first synchronous channel resource, includes: receiving the first synchronous channel resource sent by the base station, wherein the first synchronous channel resource is a synchronous channel resource allocated by the base station to the user equipment; or receiving a synchronous channel resource set sent by the base station, and selecting the first synchronous channel resource from the synchronous channel resource set, wherein the synchronous channel resource set includes at least one synchronous channel resource.

In combination with the first possible implementation manner of the first aspect, in the second possible implementation manner, when the first synchronous channel resource sent by the base station is received, if the access feedback sent by the base station is received, the access is determined to be successful.

In combination with the first possible implementation manner or the second possible implementation manner of the first aspect, in the third possible implementation manner, before the receiving the first synchronous channel resource sent by the base station, the method further includes: receiving a synchronous channel resource set sent by the base station, wherein the synchronous channel resource set includes at least one synchronous channel resource.

In combination with the first possible implementation manner of the first aspect, in the fourth possible implementation manner, when receiving the synchronous channel resource set sent by the base station, and selecting the first synchronous channel resource from the synchronous channel resource set, the method further includes: sending an uplink message to the base station according to the access feedback; receiving a competition solution message sent by the base station aiming at the uplink message; determining that the access is successful when the competition solution message belongs to a competition solution message of the user equipment.

In combination with the fourth possible implementation manner of the first aspect, in the fifth possible implementation manner, the determining that the access is successful under the condition that the competition solution message belongs to a competition solution message of the user equipment, includes: determining that the competition solution message belongs to the competition solution message of the user equipment and determining that the access is successful, when the competition solution message comprises an identifier of the user equipment.

In combination with the first possible implementation manner of the first aspect, or any possible implementation manner from the third possible implementation manner to the fifth possible implementation manner of the first aspect, in the sixth possible implementation manner, the receiving a synchronous channel resource set sent by the base station, includes: receiving index information of at least one synchronous channel resource included in the synchronous channel resource set sent by the base station.

In combination with the first aspect or any possible implementation manner in the above-mentioned possible implementation manners of the first aspect, in the seventh possible implementation manner, the using the first synchronous channel resource to send an access request to a base station, specifically includes: using the first synchronous channel resource to send the access request to the base station, when uplink data is sending; or using the first synchronous channel resource to send the access request to the base station, when triggering access notification sent by the base station is received.

In combination with the first aspect or any possible implementation manner from the first possible implementation manner to the sixth possible implementation manner of the first aspect, in the eighth possible implementation manner, the access feedback is access feedback masked by the base station by using information of sending time and frequency of the access request, or access feedback masked by the base station by using an identifier of wireless side allocated by the base station to the user equipment.

In combination with the first aspect or any possible implementation manner from the first possible implementation manner to the sixth possible implementation manner of the first aspect, in the ninth possible implementation manner, before sending the access request to the base station, the method further comprises: receiving a timing advance value sent by the base station, for performing uplink transmission according to the timing advance value; or obtaining a timing advance rule and system information, and determining a timing advance value according to the timing advance rule and the system information, for performing uplink transmission according to the timing advance value, wherein the timing advance rule is used for indicating a corresponding relationship of the system information and the timing advance value.

In combination with the ninth possible implementation manner of the first aspect, in the tenth possible implementation manner, the system information includes at least one of the following items: position information of a user equipment, position information of a base station, signal strength received by a user equipment, signal quality, pathloss, and received downlink signals of at least two base stations.

In combination with the ninth possible implementation manner or the tenth possible implementation manner of the first aspect, in the eleventh possible implementation manner, the method further includes: u setting a time alarm of a timing alignment timer to be infinite, when receiving or determining the timing advance value and accessing successfully; performing uplink transmission according to the timing advance value.

In combination with the ninth possible implementation manner or the tenth possible implementation manner of the first aspect, in the twelfth possible implementation manner, the method further includes: performing the timing alignment timer, when receiving or determining the timing advance value and accessing successfully; receiving or determining the timing advance value again, when the timing of the timing alignment timer reaches the time alarm and the timing advance value is not received or determined again.

In combination with the first aspect or any possible implementation manner from the first possible implementation manner to the sixth possible implementation manner of the first aspect, in the thirteenth possible implementation manner, when timing or counting reaches a preset threshold and an access feedback sent by the base station is not received, repeatedly implementing a process of the obtaining an first synchronous channel resource and a process of using the first synchronous channel resource to send an access request to the base station, or repeatedly implementing a process of using the first synchronous channel resource to send the access request to the base station, until the access feedback is received or sending times of the access request reach a preset maximum number.

In combination with the fourth possible implementation manner or fifth possible implementation manner of the first aspect, in the fourteenth possible implementation manner, the method further includes: when timing or counting reaches the preset threshold and a competition solution message sent by the base station aiming at the uplink message is not received, repeatedly implementing a process of obtaining the first synchronous channel resource and a process of using the first synchronous channel resource to send the access request to the base station, or repeatedly implementing the process of using the first synchronous channel resource to send the access request to the base station, until access is determined to be successful or sending times of the access request reach the preset maximum number.

In combination with the first aspect or any possible implementation manner in the above-mentioned possible implementation manners of the first aspect, in the fifteenth possible implementation manner, the synchronous channel resource includes a scheduling request resource.

In the second aspect, the embodiments of the present invention provide an access method, including: receiving an access request sent by a user equipment by using a first synchronous channel resource; and sending access feedback to the user equipment, for enabling the user equipment to determine whether access is successful according to the access feedback.

In combination with the second aspect, in the first possible implementation manner, before the receiving an access request sent by a user equipment by using a first synchronous channel resource, the method further includes: allocating the first synchronous channel resource to the user equipment, and sending the first synchronous channel resource to the user equipment; or sending a synchronous channel resource set to the user equipment, for enabling the user equipment to select the first synchronous channel resource from the synchronous channel resource set, wherein the synchronous channel resource set includes at least one synchronous channel resource.

In combination with the first possible implementation manner of the second aspect, in the second possible implementation manner, before the sending a first synchronous channel resource to the user equipment, the method further includes: sending the synchronous channel resource set to the user equipment, wherein the synchronous channel resource set includes at least one synchronous channel resource.

In combination with the first possible implementation manner of the second aspect or the second possible implementation manner of the second aspect, in the third possible implementation manner, the sending a synchronous channel resource set to the user equipment, specifically includes: sending the synchronous channel resource set to the user equipment according to system load.

In combination with the first possible implementation manner, the second possible implementation manner or the third possible implementation manner of the second aspect, in the fourth possible implementation manner, the sending a synchronous channel resource set to the user equipment, includes: sending index information of at least one synchronous channel resource included in the synchronous channel resource set to the user equipment.

In combination with the first possible implementation manner of the second aspect, in the fifth possible implementation manner, when a the synchronous channel resource set is sent to the user equipment, the method further includes: receiving an uplink message sent by the user equipment according to the access feedback; sending a competition solution message to the user equipment aiming at the uplink message, for enabling the user equipment to determine whether the access is successful according to the competition solution message.

In combination with the second aspect or any above-mentioned possible implementation manner of the second aspect, in the sixth possible implementation manner, the method further includes: sending triggering access notification to the user equipment, before receiving the access request sent by the user equipment by using the first synchronous channel resource.

In combination with the second aspect or any above-mentioned possible implementation manner of the second aspect, in the seventh possible implementation manner, the sending access feedback to the user equipment, specifically includes: masking the access feedback by using the time and frequency information of the access request sent by the user equipment, and sending the access feedback to the user equipment; or masking the access feedback by using a wireless side identifier allocated by a base station to the user equipment, and sending the access feedback to the user equipment.

In combination with the second aspect or any above-mentioned possible implementation manner of the second aspect, in the eighth possible implementation manner, the method further includes: sending a timing advance value to the user equipment, for enabling the user equipment to perform uplink transmission according to the timing advance value; or sending a timing advance rule to the user equipment, for enabling the user equipment to determine the timing advance value according to the timing advance rule and system information, wherein the timing advance rule is used for indicating a corresponding relationship of the system information and the timing advance value.

In combination with the eighth possible implementation manner of the second aspect, in the ninth possible implementation manner, the system information includes at least one of the following items: position information of a user equipment, position information of a base station, signal strength received by a user equipment, signal quality, path-loss, and received downlink signals of at least two base stations.

In combination with the second aspect or any above-mentioned possible implementation manner of the second aspect, in the tenth possible implementation manner, the method further includes: sending a time alarm of a timing alignment timer to the user equipment.

In combination with the second aspect or any above-mentioned possible implementation manner of the second aspect, in the eleventh possible implementation manner, the synchronous channel resource includes a scheduling request resource.

In the third aspect, the embodiments of the present invention provide user equipment, including: a control unit, configured to obtain a first synchronous channel resource; a sending unit, configured to use the first synchronous channel resource to send an access request to a base station; and a receiving unit, configured to receive access feedback sent by the base station.

In combination with the third aspect, in the first possible implementation manner, the receiving unit is further configured to receive the first synchronous channel resource sent by the base station, wherein the first synchronous channel resource is a synchronous channel resource allocated by the base station to the user equipment, and the control unit is specifically configured to determine the first synchronous channel resource received by the receiving unit as the first synchronous channel resource; or the receiving unit is further configured to receive a synchronous channel resource set sent by the base station, wherein the synchronous channel resource set includes at least one synchronous channel resource, and the control unit is specifically configured to select the first synchronous channel resource from the synchronous channel resource set received by the receiving unit.

In combination with the first possible implementation manner of the third aspect, in the second possible implementation manner, the receiving unit is further configured to receive a synchronous channel resource set sent by the base station, before receiving the first synchronous channel resource sent by the base station, wherein the synchronous channel resource set includes at least one synchronous channel resource.

In combination with the first possible implementation manner of the third aspect, in the third possible implementation manner, the control unit is configured to determine that access is successful, when the receiving unit receives the first synchronous channel resource sent by the base station and the receiving unit receives the access feedback sent by the base station.

In combination with the first possible implementation manner of the third aspect, in the fourth possible implementation manner, when the control unit selects the first synchronous channel resource from the synchronous channel resource set, the sending unit is further configured to send an uplink message to the base station according to the access feedback; the receiving unit is further configured to receive a competition solution message sent by the base station aiming at the uplink message; and the control unit is further configured to determine that the access is successful when the competition solution message belongs to a competition solution message of the user equipment.

In combination with the third aspect or any above-mentioned possible implementation manner of the third aspect, in the fifth possible implementation manner, the receiving unit is further configured to receive triggering access notification sent by the base station; the sending unit is further configured to use the first synchronous channel resource to send the access request to the base station, when uplink data is sent or the receiving unit receives the triggering access notification sent by the base station.

In combination with the third aspect or any possible implementation manner from the first possible implementation manner to the fourth possible implementation manner of the third aspect, in the sixth possible implementation manner, before the sending unit sends the access request to the base station, the receiving unit is further configured to receive a timing advance value sent by the base station; or the control unit is further configured to obtain a timing advance rule and system information and determine the timing advance value according to the timing advance rule and the system information, wherein the timing advance rule is used for indicating a corresponding relationship of the system information and the timing advance value.

In combination with the sixth possible implementation manner of the third aspect, in the seventh possible implementation manner, when the receiving unit receives the timing advance value or the control unit determines the timing advance value and the control unit determines that the access is successful, the control unit is further configured to set the time alarm of a timing alignment timer to be infinite.

In combination with the sixth possible implementation manner of the third aspect, in the eighth possible implementation manner, when the receiving unit receives the timing advance value or the control unit determines the timing advance value and the control unit determines that the access is successful, the control unit is further configured to control to operate the timing alignment timer, and control to implement a process of receiving or determining the timing advance value again, when timing of the timing alignment timer reaches the time alarm and the timing advance value is not received or determined again.

In combination with the third aspect or any possible implementation manner from the first possible implementation manner to the fourth possible implementation manner of the third aspect, in the ninth possible implementation manner, the user equipment further includes a timer or a counter, configured to begin to time or count when the sending unit sends the access request to the base station; the control unit is further configured to control to repeatedly implement a process of the obtaining a first synchronous channel resource and a process of using the first synchronous channel resource to send an access request to the base station, or repeatedly implement a process of using the first synchronous channel resource to send an access request to the base station, until the receiving unit receives the access feedback or the sending times of the access request reach a preset maximum number, when timing of the timer or counting of the counter reaches a preset threshold and the receiving unit does not receive an access feedback sent by the base station.

In combination with the fourth possible implementation manner of the third aspect, in the tenth possible implementation manner, the user equipment further includes:

a timer or a counter, configured to begin to time or count when the sending unit sends the uplink message to the base station;

the control unit is further configured to control to repeatedly implement a process of the obtaining a first synchronous channel resource and a process of using the first synchronous channel resource to send an access request to the base station, or repeatedly implement a process of using the first synchronous channel resource to send an access request to the base station, until the control unit determines that access is successful or the sending times of the access request reach the preset maximum number, when timing of the timer or counting of the counter reaches a preset threshold and the receiving unit does not receive a competition solution message sent by the base station aiming at the uplink message.

In the fourth aspect, the embodiments of the present invention provide a base station, including: a receiving unit, configured to receive an access request sent by a user equipment by using a first synchronous channel resource; and a sending unit, configured to send access feedback to the user equipment, for enabling the user equipment to determine whether access is successful according to the access feedback.

In combination with the fourth aspect, in the first possible implementation manner, the sending unit is further configured to send the first synchronous channel resource to the user equipment, wherein the first synchronous channel resource is a synchronous channel resource allocated by the base station to the user equipment; or the sending unit is further configured to send a synchronous channel resource set to the user equipment, for enabling the user equipment to select the first synchronous channel resource from the synchronous channel resource set, and use the first synchronous channel resource to send an access request, wherein the synchronous channel resource set includes at least one synchronous channel resource.

In combination with the first possible implementation manner of the fourth aspect, in the second possible implementation manner, the sending unit is further configured to send a synchronous channel resource set to the user equipment before sending the first synchronous channel resource to the user equipment, wherein the synchronous channel resource set includes at least one synchronous channel resource.

In combination with the first possible implementation manner or the second possible implementation manner of the fourth aspect, in the third possible implementation manner, the sending unit is specifically configured to send the synchronous channel resource set to the user equipment according to system load.

In combination with the first possible implementation manner of the fourth aspect, in the fourth possible implementation manner, when the sending unit sends a synchronous channel resource set to the user equipment, the receiving unit is further configured to receive an uplink message sent by the user equipment according to the access feedback; the sending unit is further configured to send a competition solution message to the user equipment aiming at the uplink message, for enabling the user equipment to determine whether the access is successful according to the competition solution message.

In combination with the fourth aspect or any above-mentioned possible implementation manner of the fourth aspect, in the fifth possible implementation manner, the sending unit is further configured to send triggering access notification to the user equipment.

In combination with the fourth aspect or any possible implementation manner from the first possible implementation manner to the fourth possible implementation manner of the fourth aspect, in the sixth possible implementation manner, the sending unit is further configured to mask the access feedback by using time and frequency information of the access request sent by the user equipment or mask the access feedback by using a wireless side identifier allocated by the base station to the user equipment, when the access feedback is sent to the user equipment.

In combination with the fourth aspect or any possible implementation manner from the first possible implementation manner to the fourth possible implementation manner of the fourth aspect, in the seventh possible implementation manner, the sending unit is further configured to send a timing advance value to the user equipment, for enabling the user equipment to perform uplink transmission according to the timing advance value; or the sending unit is further configured to send a timing advance rule to the user equipment, for enabling the user equipment to determine the timing advance value according to the timing advance rule and system information, wherein the timing advance rule is used for indicating a corresponding relationship of the system information and the timing advance value.

In combination with the fourth aspect or any above-mentioned possible implementation manner of the fourth aspect, in the eighth possible implementation manner, the sending unit is further configured to send a time alarm of a timing alignment timer to the user equipment.

In the fifth aspect, the embodiments of the present invention provide a user equipment, including: a processor, configured to obtain a first synchronous channel resource; a sender, configured to use the first synchronous channel resource to send an access request to a base station; and a receiver, configured to receive access feedback sent by the base station.

In combination with the fifth aspect, in the first possible implementation manner, the receiver is further configured to receive the first synchronous channel resource sent by the base station, wherein the first synchronous channel resource is a synchronous channel resource allocated by the base station to the user equipment, and the processor is specifically configured to determine the first synchronous channel resource received by the receiver as the first synchronous channel resource; or the receiver is further configured to receive a synchronous channel resource set sent by the base station, wherein the synchronous channel resource set includes at least one synchronous channel resource, and the processor is specifically configured to select the first synchronous channel resource from the synchronous channel resource set received by the receiver.

In combination with the first possible implementation manner of the fifth aspect, in the second possible implementation manner, the receiver is further configured to receive a first synchronous channel resource set sent by the base station, before receiving the first synchronous channel resource sent by the base station, wherein the synchronous channel resource set includes at least one synchronous channel resource.

In combination with the first possible implementation manner of the fifth aspect, in the third possible implementation manner, the processor is configured to determine that the access is successful, when the receiver receives the first synchronous channel resource sent by the base station and the receiver receives the access feedback sent by the base station.

In combination with the first possible implementation manner of the fifth aspect, in the fourth possible implementation manner, when the processor selects the first synchronous channel resource from the synchronous channel resource set, the sender is further configured to send an uplink message to the base station according to the access feedback; the receiver is further configured to receive a competition solution message sent by the base station aiming at the uplink message; the processor is further configured to determine that access is successful when the competition solution message belongs to a competition solution message of the user equipment.

In combination with the fifth aspect or any above-mentioned possible implementation manner of the fifth aspect, in the fifth possible implementation manner, the sender is further configured to use the first synchronous channel resource to send an access request to the base station, when uplink data is sending or the receiver receives triggering access notification sent by the base station.

In combination with the fifth aspect or any possible implementation manner from the first possible implementation manner to the fourth possible implementation manner of the fifth aspect, in the sixth possible implementation manner, before the sender sends the access request to the base station, the receiver is further configured to receive a timing advance value sent by the base station; or the processor is further configured to obtain a timing advance rule and system information, and determine a timing advance value according to the timing advance rule and the system information, wherein the timing advance rule is used for indicating a corresponding relationship of the system information and the timing advance value.

In combination with the sixth possible implementation manner of the fifth aspect, in the seventh possible implementation manner, the processor is further configured to set a time alarm of a timing alignment timer to be infinite, when the receiver receives the timing advance value or the processor determines the timing advance value and the control unit determines that the access is successful.

In combination with the sixth possible implementation manner of the fifth aspect, in the eighth possible implementation manner, the processor is further configured to begin to time when the receiver receives the timing advance value or the processor determines the timing advance value and the processor determines that access is successful, and control to implement a process of receiving or determining the timing advance value again when timing reaches a time alarm and a timing advance value is not received or determined again.

In combination with the fifth aspect or any possible implementation manner from the first possible implementation manner to the fourth possible implementation manner of the fifth aspect, in the ninth possible implementation manner. The user equipment according to any one of claims 7, 9, 10 and 11, wherein the processor is further configured to begin to time or count when the sender sends the access request to the base station; the processor is further configured to control to repeatedly implement a process of the obtaining a first synchronous channel resource and a process of using the first synchronous channel resource to send an access request to the base station, or repeatedly implement a process of using the first synchronous channel resource to send an access request to the base station, until the receiver receives the access feedback or the sending times of the access request reach a preset maximum number, when timing or counting of the processor reaches a preset threshold and the receiver does not receive an access feedback sent by the base station.

In combination with the fourth possible implementation manner of the fifth aspect, in the tenth possible implementation manner, the processor is further configured to begin to time or count when the sender sends the uplink message to the base station;

the processor is further configured to control to repeatedly implement a process of the obtaining a first synchronous channel resource and a process of using the first synchronous channel resource to send an access request to the base station, or repeatedly implement a process of using the first synchronous channel resource to send an access request to the base station, until the processor determines that access is successful or the sending times of the access request reach the preset maximum number, when the timing or counting of the processor reaches a preset threshold and the receiver does not receive a competition solution message sent by the base station aiming at the uplink message.

In the sixth aspect, the embodiments of the present invention provide a base station, including: a receiver, configured to receive an access request sent by a user equipment by using a first synchronous channel resource; and a sender, configured to send access feedback to the user equipment, for enabling the user equipment to determine whether access is successful according to the access feedback.

In combination with the sixth aspect, in the first possible implementation manner, the sender is further configured to send the first synchronous channel resource to the user equipment, wherein the first synchronous channel resource is a synchronous channel resource allocated by the base station to the user equipment; or the sender is further configured to send a synchronous channel resource set to the user equipment, for enabling the user equipment to select the first synchronous channel resource from the synchronous channel resource set, and use the first synchronous channel resource to send an access request, wherein the synchronous channel resource set includes at least one synchronous channel resource.

In combination with the first possible implementation manner of the sixth aspect, in the second possible implementation manner, the sender is further configured to send a synchronous channel resource set to the user equipment before sending the first synchronous channel resource to the user equipment, wherein the synchronous channel resource set includes at least one synchronous channel resource.

In combination with the first possible implementation manner or the second possible implementation manner of the sixth aspect, in the third possible implementation manner, the sender is specifically configured to send the synchronous channel resource set to the user equipment according to system load.

In combination with the first possible implementation manner of the sixth aspect, in the fourth possible implementation manner, when the sender sends a synchronous channel resource set to the user equipment, the receiver is further configured to receive an uplink message sent by the user equipment according to the access feedback; and the sender is further configured to send a competition solution message to the user equipment aiming at the uplink message, for enabling the user equipment to determine whether the access is successful according to the competition solution message.

In combination with the sixth aspect or any above-mentioned possible implementation manner of the sixth aspect, in the fifth possible implementation manner, the sender is further configured to send triggering access notification to the user equipment.

In combination with the sixth aspect or any possible implementation manner from the first possible implementation manner to the fourth possible implementation manner of the sixth aspect, in the sixth possible implementation manner, the sender is further configured to mask the access feedback by using time and frequency information of the access request sent by the user equipment or mask the access feedback by using a wireless side identifier allocated by the base station to the user equipment, when the access feedback is sent to the user equipment.

In combination with the sixth aspect or any possible implementation manner from the first possible implementation manner to the fourth possible implementation manner of the sixth aspect, in the seventh possible implementation manner, the sender is further configured to send a timing advance value to the user equipment, for enabling the user equipment to perform uplink transmission according to the timing advance value; or the sender is further configured to send a timing advance rule to the user equipment, for enabling the user equipment to determine the timing advance value according to the timing advance rule and system information, wherein the timing advance rule is used for indicating a corresponding relationship of the system information and the timing advance value.

In combination with the sixth aspect or any above-mentioned possible implementation manner of the sixth aspect, in the eighth possible implementation manner, the sender is further configured to send a time alarm to the user equipment.

In the embodiments of the present invention, when the user equipment implements access, the user equipment uses the synchronous channel resource for accessing. In this way, occupation of the user equipment on an access resource during access may be reduced, and utilization efficiency of the access resource is improved.

BRIEF DESCRIPTION OF DRAWINGS

In order to illustrate the technical solutions in the embodiments of the present invention more clearly, accompanying drawings needed for describing the embodiments are introduced briefly in the following. Obviously, the accompanying drawings in the following description are some embodiments of the present invention, and persons of ordinary skill in the art may further obtain other accompanying drawings according to these accompanying drawings without making creative efforts.

DESCRIPTION OF EMBODIMENTS

A clear and complete description of technical solutions in the embodiments of the present invention will be given below, in combination with the accompanying drawings in the embodiments of the present invention. Apparently, the embodiments below are a part, but not all, of the embodiments of the present invention. All of other embodiments, obtained by those of ordinary skill in the art based on the embodiments of the present invention without any inventive efforts, fall into the protection scope of the present invention.

It should be understood that, the technical solutions of the embodiments of the present invention may be applied to various communication systems, for example: a global system of mobile communication (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunication system (Universal Mobile Telecommunication System, UMTS), a wireless local area network (Wireless Local Area Networks, WLAN), a wireless fidelity (Wireless Fidelity, WiFi), a worldwide interoperability for microwave access (Worldwide Interoperability for Microwave Access, WiMAX) or the like.

User equipment may also be called a mobile terminal (Mobile Terminal, MT), mobile user equipment and the like, may communicate with one or multiple core networks through a radio access network (e.g., Radio Access Network, RAN), the user equipment may be a mobile terminal, for example, a mobile telephone (or called a "cellular" telephone) and a computer having a mobile terminal, for example, may be a portable, pocket, hand-held, computer inbuilt or vehicle-mounted mobile device.

A base station may be a base transceiver station (Base Transceiver Station, BTS) in GSM or CDMA, may also be a base station (NodeB) in WCDMA, may also be an eNB or an e-NodeB in LTE and is not limited in the present invention.

Figure 1:
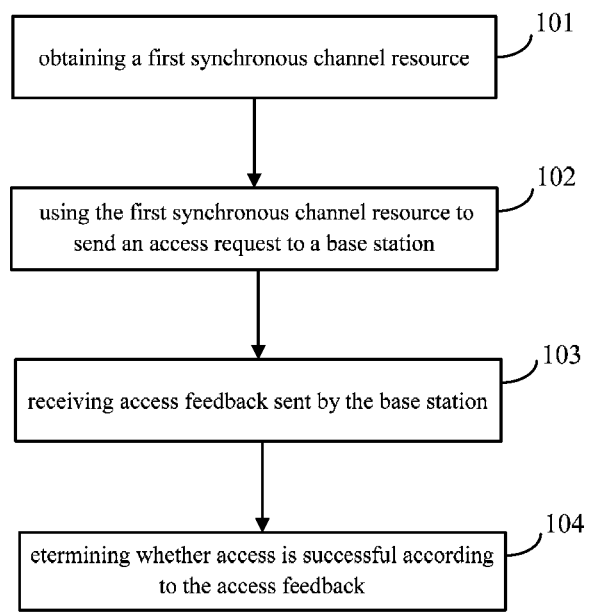
FIG. 1 is a schematic diagram of a flow of an access method of an embodiment of the present invention.

FIG. 1 is a schematic diagram of a flow of an access method of an embodiment of the present invention. The method as shown in FIG. 1 is implemented by a user equipment. As shown in FIG. 1, the method includes:
 step 101, obtaining a first synchronous channel resource;
 step 102, using the first synchronous channel resource to send an access request to a base station;
 step 103, receiving access feedback sent by the base station; and
 step 104, determining whether access is successful according to the access feedback.

In the embodiment, when the user equipment implements access, the user equipment uses the synchronous channel resource for accessing. In this way, occupation of the user equipment on an access resource during access may be reduced, and utilization efficiency of the access resource is improved.

Optionally, the obtaining the first synchronous channel resource, specifically includes: the user equipment may receive a synchronous channel resource set sent by the base station, wherein the synchronous channel resource set includes at least one synchronous channel resource. The user equipment may select a first synchronous channel resource from the synchronous channel resource set, and the access method under this condition is an access method based on competition. The user equipment may also receive the first synchronous channel resource sent by the base station, and the first synchronous channel resource may belong to the synchronous channel resource set sent by the base station and may also be a new synchronous channel resource not belonging to the synchronous channel resource set. The access method under this condition is an access method based on non-competition.

Optionally, under the condition of access based on non-competition, in step 104, the user equipment determines that the access is successful when the access feedback sent by the base station is received; under the condition of access based on competition, in step 104, after receiving the access feedback sent by the base station, the user equipment sends an uplink message to the base station according to the access feedback, receives a competition solution message sent by the base station aiming at the uplink message, and determines that the access is successful when the competition solution message belongs to a competition solution message of the user equipment.

According to the method as shown in FIG. 1, when the user equipment implements access, the user equipment uses the synchronous channel resource for accessing. In this way, occupation of the user equipment on an access resource during access may be reduced, and utilization efficiency of the access resource is improved.

Figure 2:
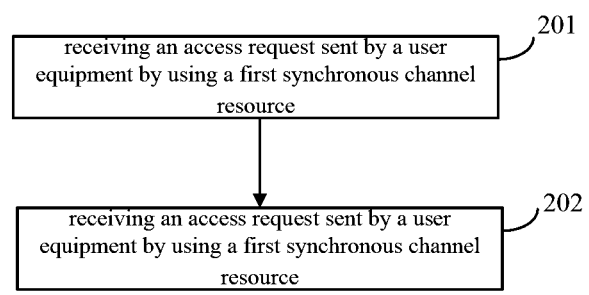
FIG. 2 is a schematic diagram of a flow of an access method of an embodiment of the present invention.

FIG. 2 is a schematic diagram of a flow of an access method of an embodiment of the present invention. The method as shown in FIG. 2 is implemented by a base station. As shown in FIG. 2, the method includes:
 step 201, receiving an access request sent by a user equipment by using a first synchronous channel resource; and
 step 202, sending access feedback to the user equipment.

Optionally, before the user equipment sends the access request by using the first synchronous channel resource, the base station may also send a synchronous channel resource set to the user equipment, wherein the synchronous channel resource set includes at least one synchronous channel resource. The user equipment may select a first synchronous channel resource from the synchronous channel resource set, and the access method under this condition is an access method based on competition. The base station may also send the first synchronous channel resource to the user equipment, and the first synchronous channel resource may belong to the synchronous channel resource set and may also be a new synchronous channel resource not belonging to the synchronous channel resource set.

Optionally, under a condition of access based on non-competition, after step 202 is implemented, if the user equipment receives the access feedback, the access is successful; under a condition of access based on competition, after step 202 is implemented, an uplink message sent by the user equipment according to the access feedback is received continually, a competition solution message is sent to the user equipment aiming at the uplink message, and if the user equipment receives the competition solution message belonging to the user equipment, the access is successful.

According to the method as shown in FIG. 2, when the user equipment implements access, the user equipment uses the synchronous channel resource for accessing. In this way, occupation of the user equipment on an access resource during access may be reduced, and utilization efficiency of the access resource is improved.

Figure 3:
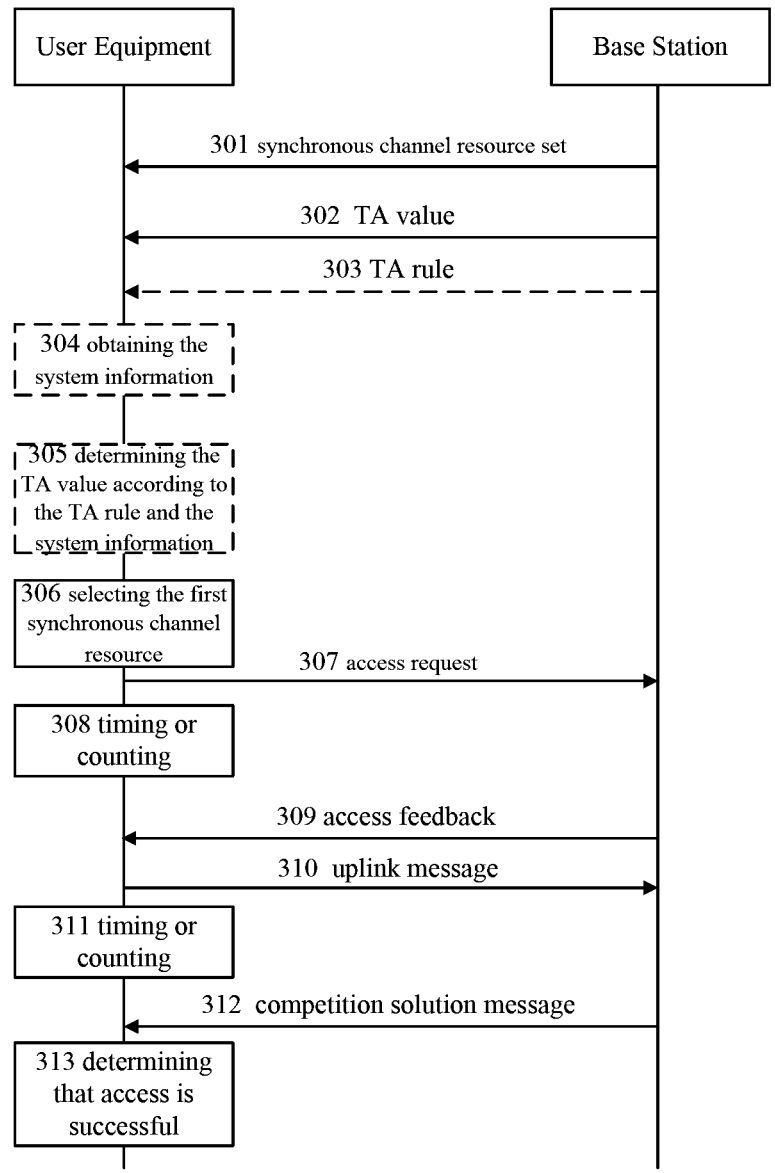
FIG. 3 is a schematic diagram of a flow of an access method of an embodiment of the present invention.

FIG. 3 is a schematic diagram of a flow of an access method of an embodiment of the present invention. The method as shown in FIG. 3 may be used in the methods as shown in FIG. 2 and FIG. 1. The method as shown in FIG. 3 is an access method based on competition, including:
 Step 301, a user equipment receives a synchronous channel resource set sent by a base station, wherein the synchronous channel resource set includes at least one synchronous channel resource.

Optionally, the base station may send the synchronous channel resource set to the user equipment according to system load. For example, under a condition of large system load, the base station may decrease the number of the synchronous channel resources in the synchronous channel resource set; under a condition of small system load, the base station may increase the number of the synchronous channel resources in the synchronous channel resource set. Compared with a condition that only 64 random access codes exist in random access, in the embodiment provided by the present invention, the base station may dynamically adjust the number of the synchronous channel resources in the synchronous channel resource set according to the system load, and the number of the synchronous channel resources in the synchronous channel resource set may be larger than the number of the random access codes. Thus, compared with the random access method, the present method may reduce conflict and time delay caused by small number of random access codes.

Optionally, the synchronous channel resource includes at least one of the following items: a time domain resource of the synchronous channel, a frequency domain resource of the synchronous channel, and a code resource of the synchronous channel.

Optionally, the base station may send the synchronous channel resource to the user equipment, and may also send index information of at least one synchronous channel resource included in the synchronous channel resource set.

Optionally, the synchronous channel resource may be a scheduling request resource, or other synchronous resources.

Optionally, the user equipment may obtain uplink synchronization by obtaining a TA value under the condition of asynchronous uplink. Under this condition, step 302 or steps 303 to 305 may be implemented. In the embodiment of the present invention, step 302 or steps 303 to 305 may be implemented prior to step 301 and may also be simultaneously implemented with step 301.

Step 302, the user equipment may receive the TA value sent by the base station.

Step 303, the user equipment obtains a TA rule.

The TA rule is used for indicating a threshold of system information and a TA value corresponding to the threshold. The user equipment may obtain the TA rule preset in the user equipment, and may also receive the TA rule sent by the base station.

Step 304, the user equipment obtains the system information.

Optionally, the system information includes at least one of the following items: position information of the user equipment, position information of the base station, strength of a signal received by the user equipment, signal quality, path-loss, and downlink signals received by the user equipment from at least two base stations.

Step 305, the user equipment determines the TA value according to the TA rule and the system information.

Specifically, the user equipment may obtain position information of the user equipment, and determine the TA value according to the position of the user equipment and a threshold in the TA rule corresponding to the position; the user equipment may obtain strength of a receiving signal, and determine the TA value according to the strength of the receiving signal and a threshold in the TA rule corresponding to the strength of the receiving signal; the user equipment may measure signal quality, and determine the TA value according to the signal quality and a threshold in the TA rule corresponding to the signal quality; the user equipment may measure path-loss to a serving base station, and determine the TA value according to the path-loss and a threshold in the TA rule corresponding to the path-loss; the user equipment may receive position information of at least one base station sent by the serving base station, for example, the position information may be longitude and latitude information, the user equipment calculates distance with the base station according to the position information of the base station and the position information of the user equipment, and determines the TA value in combination with signal propagation speed and a threshold in the TA rule corresponding to the result; the user equipment receives downlink signals of at least two base stations, calculates time difference of receiving the downlink signals, and determines the TA value according to a threshold in the TA rule corresponding to the calculated time difference of the at least two downlink signals. It should be noted that, in the above-mentioned method, at least two base stations are combined to help to optimize or correct the TA value determined by the user equipment, for example, the user equipment measures first downlink path-loss to a first base station and second downlink path-loss to a second base station, wherein the first base station and the second base station are base stations adjacent to the serving base station of the user equipment, and the user equipment determines the TA value according to a threshold in the TA rule corresponding to the first downlink path-loss and the second downlink path-loss.

Step 306, the user equipment selects the first synchronous channel resource from the synchronous channel resource set.

Optionally, the user equipment may randomly select the first synchronous channel resource and may also select the first synchronous channel resource according to particular information, for example, selecting the first synchronous channel resource according to the TA value.

Step 307, the user equipment uses the first synchronous channel resource to send an access request to the base station.

Optionally, the user equipment may send the access request to the base station when uplink data is sending, and may also send the access request to the base station when triggering access notification sent by the base station is received.

Optionally, power for sending the access request is determined in an open loop power control manner.

Step 308, the user equipment begins to time or count when the access request is sent to the base station.

Step 309, the base station sends access feedback to the user equipment aiming at the access request sent by the user equipment.

Optionally, the base station may mask the access feedback by using sending time and frequency information of the access request, and the access feedback includes an uplink resource. The user equipment may send an uplink message according to the uplink resource in the access feedback, and the base station may send a competition solution message to the user equipment aiming at the uplink message, which specifically includes:

step 310, the user equipment sends the uplink message to the base station by using the uplink resource in the access feedback, when the timing or counting reaches a preset threshold and the access feedback is received.

The access feedback may be masked by time and frequency information identifying the sending of the access request.

The uplink message includes an identity (Identity, ID) identifying the user equipment, for example, when the uplink message is a radio resource control (Radio Resource Control, RRC) connection establishment request message, the ID of the user equipment contained in the uplink message is an SAE-temporary mobile subscriber identity (SAE-Temporary Mobile Subscriber Identity, S-TMSI); when the user equipment obtains a cell radio network temporary identifier (Cell Radio Network Temporary Identifier, C-RNTI) allocated by the base station, the C-RNTI is contained in the uplink message to serve as the ID of the user equipment.

Optionally, when the access feedback is not received within a preset time, the user equipment repeatedly implements a process of obtaining the first synchronous channel resource and a process of using the first synchronous channel resource to send the access request to the base station, or repeatedly implements a process of using the first synchronous channel resource to send the access request to the base station, until the access feedback is received within the preset time or sending times of the access request reach a preset maximum number. At this time, the sending power of the access request may climb according to a particular rule.

Step 311, the user equipment begins to time or counter when the uplink message is sent to the base station.

Step 312, the base station sends the competition solution message to the user equipment aiming at the uplink message.

Step 313, the user equipment determines that access is successful when the competition solution message is obtained and the competition solution message belongs to the user equipment.

Optionally, when the competition solution message includes the ID of the user equipment, the competition solution message belongs to the user equipment. For example, the ID may be S-TMSI and C-RNTI.

Optionally, the user equipment determines that the access is successful when timing or counting is within a preset threshold and the competition solution message sent by the base station aiming at the uplink message is received.

Optionally, when the timing or counting reaches the preset threshold and the competition solution message sent by the base station aiming at the uplink message is not received, the user equipment repeatedly implements a process of obtaining the first synchronous channel resource and a process of using the first synchronous channel resource to send the access request to the base station, or repeatedly implements a process of using the first synchronous channel resource to send the access request to the base station, until the access is determined to be successful or the sending times of the access request reach the preset maximum number. At this time, the sending power of the access request may climb according to a particular rule.

Optionally, when the user equipment obtains the TA value and accesses successfully, the user equipment sets a time alarm of TAT to be infinite. When the time alarm of TAT is set to be infinite, the user equipment determines it to be permanently synchronous, the base station may schedule the uplink and downlink data of the user equipment at any time, and the user equipment may transmit uplink data and/or feedback signaling according to current TA value and a scheduling command, so as not to implement the synchronous process again due to TAT overtime. Wherein, the user equipment may receive the time alarm of TAT sent by the base station and set the time alarm of TAT according to the time alarm.

Optionally, when the user equipment obtains the TA value and accesses successfully, the TAT is operated and the time alarm of TAT is not infinite, the timing of the TAT reaches the time alarm, and the TA value is not obtained again, step 302 or steps 303 to 305 are repeatedly implemented to achieve synchronization. Wherein, the user equipment may receive the time alarm of TAT sent by the base station and set the time alarm of TAT according to the time alarm.

According to the method as shown in FIG. 3, when the user equipment implements access, the user equipment uses the synchronous channel resource for accessing. In this way, occupation of the user equipment on an access resource during access may be reduced, and utilization efficiency of the access resource is improved.

Figure 4:
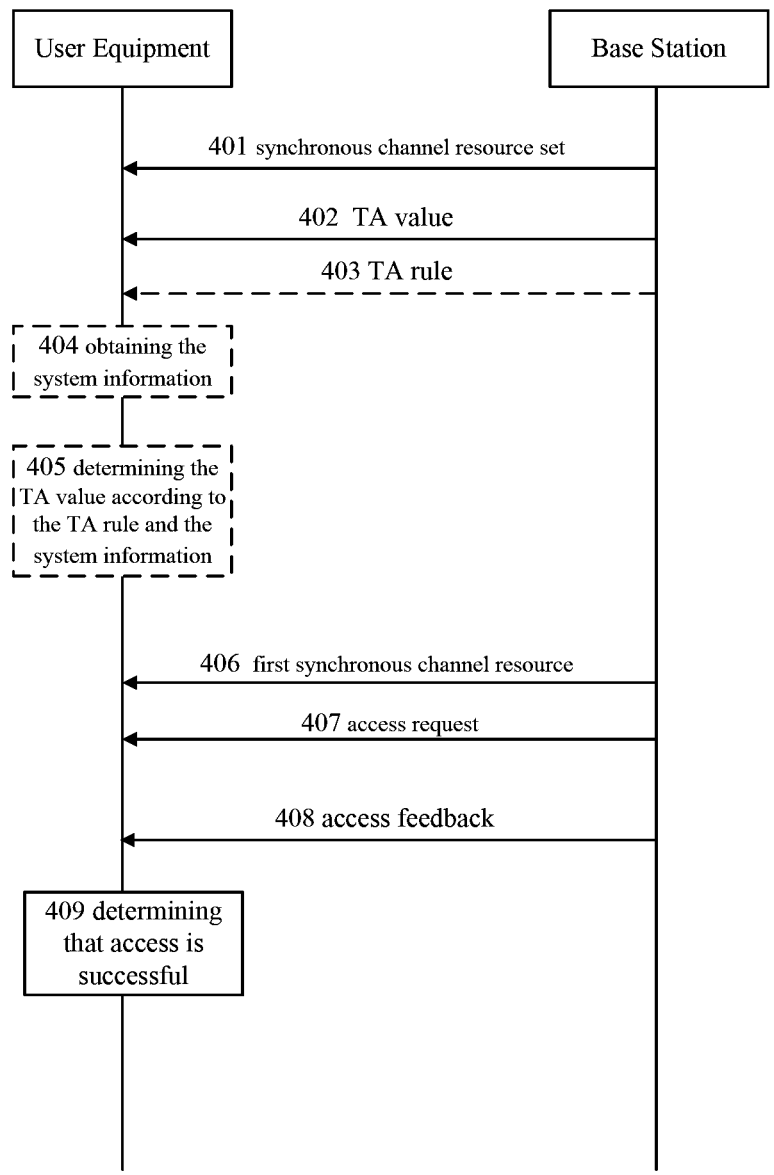
FIG. 4 is a schematic diagram of a flow of an access method of an embodiment of the present invention.

FIG. 4 is a schematic diagram of a flow of another access method of an embodiment of the present invention. The method shown in FIG. 4 is an access method based on non-competition, including:

Step 401, a user equipment receive a synchronous channel resource set sent by a base station, wherein the synchronous channel resource set includes at least one synchronous channel resource.

Optionally, the base station may send the synchronous channel resource set to the user equipment according to system load. For example, under a condition of large system load, the number of the synchronous channel resources in the synchronous channel resource set may be decreased; under a condition of small system load, the number of the synchronous channel resources in the synchronous channel resource set may be increased. Compared with a condition that only 64 random access codes exist in random access, in the embodiment provided by the present invention, the base station may dynamically adjust the number of the synchronous channel resources in the synchronous channel resource set according to the system load, and the number of the synchronous channel resources in the synchronous channel resource set may be larger than the number of the random access codes. Thus, compared with the random access method, the present method may reduce conflict and time delay caused by small number of random access codes.

Optionally, the synchronous channel resource includes at least one of the following items: a time domain resource of the synchronous channel, a frequency domain resource of the synchronous channel, and a code resource of the synchronous channel.

Optionally, the base station may send the synchronous channel resource to the user equipment, and may also send index information of at least one synchronous channel resource included in the synchronous channel resource set.

Optionally, the synchronous channel resource may be a scheduling request resource, or other synchronous resources.

Optionally, the user equipment may obtain uplink synchronization by obtaining a TA value under the condition of asynchronous uplink. Under this condition, step 402 or steps 403 to 405 may be implemented. In the embodiment of the present invention, step 402 or steps 403 to 405 may be implemented prior to step 401 and may also be simultaneously implemented with step 401.

Step 402, the user equipment may receive the TA value sent by the base station.

Step 403, the user equipment obtains a TA rule.

The TA rule is used for indicating a threshold of system information and a TA value corresponding to the threshold. The user equipment may obtain the TA rule preset in the user equipment, and may also receive the TA rule sent by the base station.

Step 404, the user equipment obtains the system information.

Optionally, the system information includes at least one of the following items: position information of the user equipment, position information of the base station, strength of a signal received by the user equipment, signal quality, pathloss, and downlink signals received by the user equipment from at least two base stations.

Step 405, the user equipment determines the TA value according to the TA rule and the system information.

Specifically, the user equipment may obtain position information of the user equipment, and determine the TA value according to the position of the user equipment and a threshold in the TA rule corresponding to the position; the user equipment may obtain strength of a receiving signal, and determine the TA value according to the strength of the receiving signal and a threshold in the TA rule corresponding to the strength of the receiving signal; the user equipment may measure signal quality, and determine the TA value according to the signal quality and a threshold in the TA rule corresponding to the signal quality; the user equipment may measure path-loss to a serving base station, and determine the TA value according to the path-loss and a threshold in the TA rule corresponding to the path-loss; the user equipment may receive position information of at least one base station sent by the serving base station, for example, the position information may be longitude and latitude information, the user equipment calculates distance with the base station according to the position information of the base station and the position information of the user equipment, and determines the TA value in combination with signal propagation speed and a threshold in the TA rule corresponding to the result; the user equipment receives downlink signals of at least two base stations, calculates time difference of receiving the downlink signals, and determines the TA value according to a threshold in the TA rule corresponding to the calculated time difference of the at least two downlink signals. It should be noted that, in the above-mentioned method, at least two base stations are combined to help to optimize or correct the TA value determined by the user equipment, for example, the user equipment measures first downlink path-loss to a first base station and second downlink path-loss to a second base station, wherein the first base station and the second base station are base stations adjacent to the serving base station of the user equipment, and the user equipment determines the TA value according to a threshold in the TA rule corresponding to the first downlink path-loss and the second downlink path-loss.

Step 406, a first synchronous channel resource sent by the base station is received.

Optionally, the base station may select the first synchronous channel resource from the synchronous channel resource set, and send the first synchronous channel resource to the user equipment. The base station may also select a new synchronous channel resource not belonging to the synchronous channel resource set to serve as the first synchronous channel resource, and send the first synchronous channel resource to the user equipment, under this condition, step 401 may not be implemented. The base station may randomly select the first synchronous channel resource and may also select the first synchronous channel resource according to particular information, for example, selecting the first synchronous channel resource according to the TA value. The first synchronous channel resource may be at least one of the following items: a time domain resource of the first synchronous channel, a frequency domain resource of the first synchronous channel and a code resource of the first synchronous channel. The base station may send the index information of the first synchronous channel resource to the user equipment.

Step 407, the user equipment uses the first synchronous channel resource to send an access request to the base station.

Optionally, power for sending the access request is determined in an open loop power control manner.

Optionally, the base station may send triggering access notification to the user equipment, for enabling the user equipment to use the first synchronous channel resource to send the access request to the base station after obtaining the triggering access notification.

Step 408, the base station sends access feedback aiming at the access request to the user equipment.

Step 409, the user equipment determines that access is successful when the access feedback is received.

The access feedback may be masked by time and frequency information identifying the sending of the access request, and the access feedback includes an uplink resource; the base station may also allocate a wireless side identifier (e.g., C-RNTI) to the user equipment, the access feedback may be masked by the wireless side identifier, and the access feedback includes an uplink data scheduling command masked by the wireless side identifier.

Optionally, the user equipment may begin to time or count when the access request is sent to the base station. When timing or counting is within a preset threshold and the user equipment receives the access feedback masked by a sending time and frequency identifier of the access request, or timing or counting is within the preset threshold and the user equipment receives the access feedback masked by the wireless side identifier allocated by the base station to the user equipment, the user equipment determines that the access is successful. When the timing or counting is within the preset threshold and the user equipment does not receive the access feedback, the user equipment repeatedly implements a process of obtaining the first synchronous channel resource and a process of using the first synchronous channel resource to send the access request to the base station, or repeatedly implements a process of using the first synchronous channel resource to send the access request to the base station, until the access feedback is received within a preset time or sending times of the access request reach a preset maximum number. At this time, the sending power of the access request may climb according to a particular rule.

Optionally, the user equipment may not perform timing or counting after sending the access request to the base station. Under this condition, the user equipment repeatedly implements a process of obtaining the first synchronous channel resource and a process of using the first synchronous channel resource to send the access request to the base station, or repeatedly implements a process of using the first synchronous channel resource to send the access request to the base station, until the access feedback is received within the preset time or the sending times of the access request reach the preset maximum number. At this time, the sending power of the access request may climb according to a particular rule.

Optionally, when the user equipment obtains the TA value and accesses successfully, the user equipment sets a time alarm of TAT to be infinite. When the time alarm of TAT is set to be infinite, the user equipment determines it to be permanently synchronous, the base station may schedule the uplink and downlink data of the user equipment at any time, and the user equipment may transmit uplink data and/or feedback signaling according to current TA value and a scheduling command, so as not to implement the synchronous process again due to TAT overtime. Wherein, the user equipment may receive the time alarm of TAT sent by the base station and set the time alarm of TAT according to the time alarm.

Optionally, when the user equipment obtains the TA value and accesses successfully, the TAT is operated and the time alarm of TAT is not infinite, the timing of the TAT reaches the time alarm, and the TA value is not obtained again, step 402 or steps 403 to 405 are repeatedly implemented to achieve synchronization. Wherein, the user equipment may receive the time alarm of TAT sent by the base station and set the time alarm of TAT according to the time alarm.

According to the method as shown in FIG. 4, when the user equipment implements access, the user equipment uses the synchronous channel resource for accessing. In this way, occupation of the user equipment on an access resource during access may be reduced, and utilization efficiency of the access resource is improved.

Figure 5:
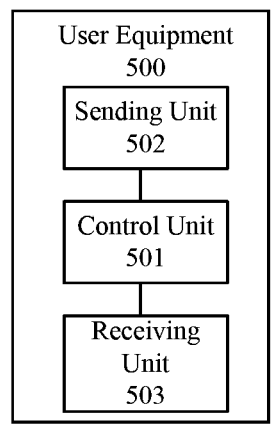
FIG. 5 is a schematic block diagram of user equipment of an embodiment of the present invention.

FIG. 5 is a schematic block diagram of a user equipment 500 of an embodiment of the present invention. The user equipment may achieve the above-mentioned method embodiment. The user equipment 500 includes: a control unit 501, a sending unit 502 and a receiving unit 503.

The control unit 501 is configured to obtain a first synchronous channel resource.

The sending unit 502 is configured to use the first synchronous channel resource to send an access request to a base station.

The receiving unit 503 is configured to receive access feedback sent by the base station.

The control unit 501 is further configured to determine whether access is successful according to the access feedback.

Optionally, before the control unit 501 obtains the first synchronous channel resource, the receiving unit 503 may also receive a synchronous channel resource set sent by the base station, wherein the synchronous channel resource set includes at least one synchronous channel resource. The control unit 501 may select the first synchronous channel resource from the synchronous channel resource set, and the access under this condition is access based on competition. The receiving unit 503 may also receive the first synchronous channel resource sent by the base station, the first synchronous channel resource may belong to the synchronous channel resource set and may also be a new synchronous channel resource not belonging to the synchronous channel resource set, and the access under this condition is access based on non-competition.

Optionally, under a condition of access based on non-competition, the receiving unit 503 is configured to receive the access feedback sent by the base station aiming at the access request, and the control unit 501 is further configured to determine that the access is successful when the receiving unit 503 receives the access feedback. Under a condition of access based on competition, the receiving unit 503 is configured to receive the access feedback sent by the base station aiming at the access request, the sending unit 502 is further configured to send an uplink message to the base station aiming at the access feedback, the receiving unit 503 is further configured to receive a competition solution message sent by the base station aiming at the uplink message, and the control unit 501 is further configured to determine that the access is successful when the competition solution message belongs to the competition solution message of the user equipment.

According to the user equipment as shown in FIG. 5, when the user equipment implements access, the user equipment uses the synchronous channel resource for accessing. In this way, occupation of the user equipment on an access resource during access may be reduced, and utilization efficiency of the access resource is improved.

Figure 6:
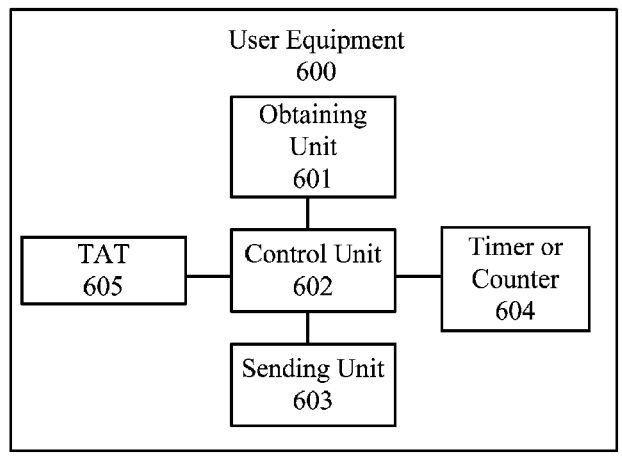
FIG. 6 is a schematic block diagram of user equipment provided by another embodiment of the present invention.

FIG. 6 is a schematic block diagram of a user equipment provided by another embodiment of the present invention. The user equipment 600 shown in FIG. 6 is an embodiment of the user equipment 500. The user equipment 600 includes: a receiving unit 601, a control unit 602, a sending unit 603, a timer or counter 604 and a TAT 605.

The receiving unit 601 is configured to receive a synchronous channel resource set sent by a base station, wherein the synchronous channel resource set includes at least one synchronous channel resource.

Optionally, the synchronous channel resource includes at least one of the following items: a time domain resource of the synchronous channel, a frequency domain resource of the synchronous channel, and a code resource of the synchronous channel.

Optionally, the base station may send the synchronous channel resource to the user equipment, and may also send index information of at least one synchronous channel resource included in the synchronous channel resource set.

Optionally, the synchronous channel resource may be a scheduling request resource, or other synchronous resources.

The control unit 602 is configured to obtain a first synchronous channel resource.

The first synchronous channel resource may be at least one of the following items: a time domain resource of the first synchronous channel, a frequency domain resource of the first synchronous channel and a code resource of the first synchronous channel.

Optionally, the control unit 602 may randomly select the first synchronous channel resource from the synchronous channel resource set received by the receiving unit 601, or select the first synchronous channel resource according to particular information, for example, selecting the first synchronous channel resource according to a TA value, and the access under this condition is access based on competition. The control unit 602 may also obtain the first synchronous channel resource sent by the base station to serve as the first synchronous channel resource, and the access under this condition is access based on non-competition. Specifically, the base station may randomly select the first synchronous channel resource from the synchronous channel resource set, or select the first synchronous channel resource according to particular information, for example, the first synchronous channel resource is selected according to the TA value, and the first synchronous channel resource is sent to the user equipment, the base station may send the first synchronous channel resource to the user equipment and may also send the index information of the first synchronous channel resource to the user equipment; the base station may also allocate a new synchronous channel resource to the user equipment and send the new synchronous channel resource to the user equipment to serve as the first synchronous channel resource. Optionally, the first synchronous channel resource may be a scheduling request resource, or other synchronous resources.

The sending unit 603 is configured to use the first synchronous channel resource obtained by the control unit 602 to send an access request to the base station.

Optionally, for an access method based on competition, the sending unit 603 may send the access request to the base station when uplink data is sent, and may also send the access request to the base station when the receiving unit 601 receives triggering access notification sent by the base station. For an access method based on non-competition, the sending unit 603 may send the access request to the base station when the receiving unit 601 receives the triggering access notification sent by the base station.

The receiving unit 601 is further configured to receive access feedback sent by the base station aiming at the access request, and the control unit 602 is further configured to determine that access is successful when the receiving unit 601 receives the access feedback; or the receiving unit 601 is further configured to receive the access feedback sent by the base station aiming at the access request, the sending unit 603 is further configured to send an uplink message to the base station according to the access feedback, the receiving unit 601 is further configured to receive a competition solution message sent by the base station aiming at the uplink message, and the control unit 602 is further configured to determine that the access is successful when the competition solution message received by the receiving unit 601 belongs to the competition solution message of the user equipment.

For the access method based on non-competition, the control unit 602 determines that the access is successful when the receiving unit 601 receives the access feedback; for the access method based on competition, the control unit 602 determines that the access is successful when the competition solution message received by the receiving unit 601 belongs to the competition solution message of the user equipment.

Optionally, under the condition of asynchronous uplink, the user equipment 600 may also obtain uplink synchronization by obtaining the TA value before the sending unit 603 sends the access request to the base station. As an embodiment, before the sending unit 603 sends the access request to the base station, the receiving unit 601 may receive the TA value sent by the base station. As another embodiment, the control unit 602 is further configured to obtain a TA rule and system information and determine the TA value according to the TA rule and the system information, wherein the TA rule is used for indicating a corresponding relationship of the system information and the TA value, and the system information includes at least one of the following items: position information of the user equipment, position information of the base station, strength of a signal received by the user equipment, signal quality, path-loss, and received downlink signals of at least two base stations. Specifically, the control unit 602 may receive the TA rule sent by the base station through the receiving unit 601, and the control unit 602 may also obtain a preset TA rule from the user equipment 600; the receiving unit 601 receives the system information sent by the base station, and the control unit 602 obtains the system information according to the information sent by the base station and received by the receiving unit 601; and the control unit 602 determines the TA value according to the TA rule and the system information.

Optionally, as an embodiment, the user equipment 600 may further include a timer or a counter 604, configured to begin to time or count when the sending unit 603 sends the access request to the base station. When timing or counting of the timer or counter 604 reaches a preset threshold and the receiving unit 601 does not receive the access feedback again, the control unit 602 may control to repeatedly implement a process of obtaining the first synchronous channel resource and a process of using the first synchronous channel resource to send the access request to the base station, or repeatedly implement a process of using the first synchronous channel resource to send the access request to the base station, until the timing or counting of the timer or counter 604 is within the preset threshold and the access feedback is received or sending times of the access request reach a preset maximum number. At this time, sending power of the access request may climb according to a particular rule. Optionally, as an embodiment, under the condition of being applied to access based on non-competition, when the timing or counting of the timer or counter 604 is within the preset threshold and the receiving unit 601 receives the access feedback, the control unit 602 may determine that the access is successful. Optionally, as another embodiment, under the condition of being applied to access based on competition, when the timing or counting of the timer or counter 604 is within the preset threshold and the receiving unit 601 receives the access feedback, the sending unit 603 may send an uplink message to the base station according to an uplink resource in the access feedback.

Optionally, as another embodiment, the user equipment 600 may do not include a timer or a counter 604, under this condition, the control unit 602 may control to repeatedly implement a process of obtaining the first synchronous channel resource and a process of using the first synchronous channel resource to send the access request to the base station, or repeatedly implement a process of using the first synchronous channel resource to send the access request to the base station, until the access feedback is received or sending times of the access request reach the preset maximum number. At this time, sending power of the access request may climb according to a particular rule.

Optionally, as an embodiment, under the condition of being applied to access based on competition, the user equipment 600 may include a timer or a counter 604, configured to begin to time or count when the sending unit 603 sends the uplink message to the base station. When timing or counting of the timer or counter 604 is within a preset threshold and the receiving unit 601 receives a competition solution message, the control unit 602 may determine that the access is successful. When the timing or counting of the timer or counter 604 reaches the preset threshold and the receiving unit 601 does not receive the competition solution message, the control unit 602 may control to repeatedly implement a process of obtaining the first synchronous channel resource and a process of using the first synchronous channel resource to send the access request to the base station, or repeatedly implement a process of using the first synchronous channel resource to send the access request to the base station, until the access is determined to be successful or sending times of the access request reach a preset maximum number. At this time, sending power of the access request may climb according to a particular rule.

Optionally, as an embodiment, the user equipment 600 may further include a TAT 605. When the receiving unit 601 receives the TA value or the control unit determines the TA value and the access is successful, the control unit 602 may set a time alarm of the TAT 605 to be infinite. When the time alarm of the TAT 605 is infinite, the control unit 602 determines the user equipment 600 to be permanently synchronous. Under this condition, the base station may schedule uplink and downlink data of the user equipment 600 at any time, the user equipment 600 may transmit uplink data and/or feedback signaling according to the current TA value and a scheduling command, so as not to implement a synchronous process again due to TAT overtime. When the receiving unit 601 receives the TA value or the control unit determines the TA value and the access is successful, when the TAT 605 begins to time and the time alarm of the TAT 605 is set to be infinite, the control unit 602 may also control the user equipment 600 to obtain the TA value again when timing of the TAT 605 reaches a preset time and the receiving unit 601 does not receive the TA value again or the control unit 602 does not determine the TA value again, wherein the receiving unit 601 may receive the time alarm of the TAT sent by the base station.

According to the user equipment as shown in FIG. 6, when the user equipment implements access, the user equipment uses the synchronous channel resource for accessing. In this way, occupation of the user equipment on an access resource during access may be reduced, and utilization efficiency of the access resource is improved.

Figure 7:
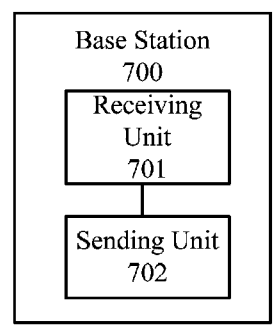
FIG. 7 is a schematic block diagram of a base station of an embodiment of the present invention.

FIG. 7 is a schematic block diagram of a base station 700 of an embodiment of the present invention. The base station may be used for realizing the above-mentioned method embodiment, and the base station 700 includes a receiving unit 701 and a sending unit 702.

The receiving unit 701 is configured to receive an access request sent by a user equipment by using a first synchronous channel resource.

The sending unit 702 is configured to send access feedback to the user equipment.

Optionally, the sending unit 702 may also send a synchronous channel resource set to the user equipment, before the receiving unit receives the access request sent by the user equipment by using the first synchronous channel resource, wherein the synchronous channel resource set includes at least one synchronous channel resource. The user equipment may select the first synchronous channel resource from the synchronous channel resource set, and access under this condition is access based on competition. The sending unit 702 may also send the first synchronous channel resource to the user equipment, the first synchronous channel resource may belong to the synchronous channel resource set and may also be a new synchronous channel resource not belonging to the synchronous channel resource set, and access under this condition is access based on non-competition.

Optionally, under the condition of access based on non-competition, the sending unit 702 is configured to send the access feedback to the user equipment. Under the condition based on competition, the sending unit 702 is configured to send the access feedback to the user equipment, the receiving unit 701 is further configured to receive an uplink message sent by the user equipment according to the access feedback, and the sending unit 702 is further configured to send a competition solution message to the user equipment aiming at the uplink message.

According to the base station as shown in FIG. 7, when the user equipment implements access, the user equipment uses the synchronous channel resource for accessing. In this way, occupation of the user equipment on an access resource during access may be reduced, and utilization efficiency of the access resource is improved.

Figure 8:
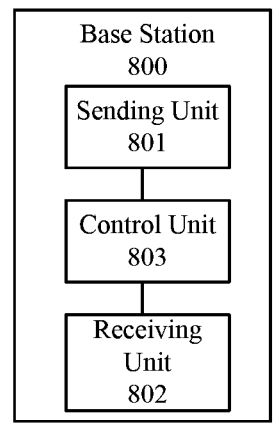
FIG. 8 is a schematic block diagram of a base station provided by another embodiment of the present invention.

FIG. 8 is a schematic block diagram of a base station provided by another embodiment of the present invention. The base station 800 shown in FIG. 8 is an embodiment of the base station 700. The base station 800 includes a sending unit 801, a receiving unit 802 and a control unit 803.

The sending unit 801 is configured to send a synchronous channel resource set to a user equipment, wherein the synchronous channel resource set includes at least one synchronous channel resource.

Optionally, the synchronous channel resource includes at least one of the following items: a time domain resource of the synchronous channel, a frequency domain resource of the synchronous channel, and a code resource of the synchronous channel.

Optionally, the base station may send the synchronous channel resource to the user equipment, and may also send index information of at least one synchronous channel resource included in the synchronous channel resource set.

Optionally, the synchronous channel resource may be a scheduling request resource, or other synchronous resources.

The receiving unit 802 is configured to receive an access request sent by the user equipment by using a first synchronous channel resource.

The sending unit 801 is further configured to send access feedback to the user equipment; or the sending unit 801 is further configured to send the access feedback to the user equipment, the receiving unit 802 is further configured to receive an uplink message sent by the user equipment according to the access feedback, and the sending unit 801 is further configured to send a competition solution message to the user equipment aiming at the uplink message.

Optionally, the sending unit 801 may be specifically configured to send the synchronous channel resource set to the user equipment according to system load. For example, under a condition of large system load, the sending unit 801 may decrease the number of the synchronous channel resources in the synchronous channel resource set sent to the user equipment; under a condition of small system load, the sending unit 801 may increase the number of the synchronous channel resources in the synchronous channel resource set sent to the user equipment.

Optionally, as an embodiment, under the condition of being applied to access based on non-competition, the base station 800 may further include the control unit 803, configured to allocate a synchronous channel resource to the user equipment and use the synchronous channel resource as the first synchronous channel resource. Specifically, the control unit 803 may select the first synchronous channel resource from the synchronous channel resource set and may also allocate a new synchronous channel resource to serve as the first synchronous channel resource. The sending unit 801 is further configured to send the first synchronous channel resource to the user equipment. The first synchronous channel resource may be at least one of a time domain resource of the first synchronous channel, a frequency domain resource of the first synchronous channel and a code resource of the first synchronous channel. The sending unit may also send index information of the first synchronous channel resource to the user equipment. The first synchronous channel resource may be a scheduling request resource, or other synchronous resources.

Optionally, as an embodiment, the base station 800 may further include the control unit 803. The control unit 803 may be configured to allocate a wireless side identifier to the user equipment and may also be configured to mask the access feedback by using time and frequency information of the access request received by the receiving unit 802 or mask the access feedback by using the wireless side identifier for example, C-RNTI, allocated by the control unit, for enabling the sending unit 801 to send the access feedback to the user equipment according to the access feedback masked by the control unit 803.

Optionally, as an embodiment, the sending unit 801 may also send a TA value to the user equipment. As another embodiment, the sending unit may also send a TA rule to the user equipment, for enabling the user equipment to determine the TA value according to the TA rule and system information, and the system information includes at least one of the following items: position information of the user equipment, position information of the base station, strength of a signal received by the user equipment, signal quality, path-loss, and received downlink signals of at least two base stations. Optionally, the sending unit 801 may also send the system information to the user equipment according to the TA rule. The sending unit may also send a time alarm of a TAT to the user equipment, for enabling the user equipment to set the time alarm of the TAT according to the time alarm.

According to the base station as shown in FIG. 8, when the user equipment implements access, the user equipment uses the synchronous channel resource for accessing. In this way, occupation of the user equipment on an access resource during access may be reduced, and utilization efficiency of the access resource is improved.

Figure 9:
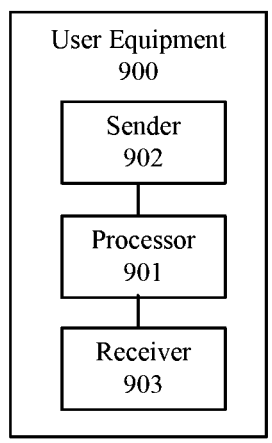
FIG. 9 is a schematic block diagram of user equipment provided by another embodiment of the present invention.

FIG. 9 is a schematic block diagram of user equipment provided by another embodiment of the present invention, the user equipment may be used for realizing the above-mentioned method embodiment, and the user equipment 900 includes a processor 901, a sender 902 and a receiver 903.

The processor 901 is configured to obtain a first synchronous channel resource;

the sender 902 is configured to use the first synchronous channel resource to send an access request to a base station;

the receiver 903 is configured to receive access feedback sent by the base station; and the processor 901 is further configured to determine whether access is successful according to the access feedback.

The receiver 903 is further configured to receive the first synchronous channel resource sent by the base station, wherein the first synchronous channel resource is a synchronous channel resource allocated by the base station to the user equipment, and the processor 901 is specifically configured to determine the first synchronous channel resource received by the receiver 903 as the first synchronous channel resource; or, the receiver 903 is further configured to receive a synchronous channel resource set sent by the base station, wherein the synchronous channel resource set includes at least one synchronous channel resource, and the processor 901 is specifically configured to select the first synchronous channel resource from the synchronous channel resource set received by the receiver 903.

The receiver 903 is further configured to receive a synchronous channel resource set sent by the base station, before receiving the first synchronous channel resource sent by the base station, wherein the synchronous channel resource set includes at least one synchronous channel resource.

When the receiver 903 receives the first synchronous channel resource sent by the base station and the receiver 903 receives the access feedback sent by the base station, the processor 901 is further configured to determine that the access is successful.

When the processor 901 selects the first synchronous channel resource from the synchronous channel resource set, the sender 902 is further configured to send an uplink message to the base station according to the access feedback; the receiver 903 is further configured to receive a competition solution message sent by the base station aiming at the uplink message; the processor 901 is further configured to determine that the access is successful when the competition solution message belongs to the competition solution message of the user equipment.

The receiver 903 is further configured to receive triggering access notification sent by the base station; and the sender 902 is further configured to use the first synchronous channel resource to send the access request to the base station, when uplink data is sent or the receiver 903 receives the triggering access notification sent by the base station.

Before the sender 902 sends the access request to the base station, the receiver 903 is further configured to receive a timing advance value sent by the base station; or the processor 901 is further configured to obtain a timing advance rule and system information and determine the timing advance value according to the timing advance rule and the system information, wherein the timing advance rule is used for indicating a corresponding relationship of the system information and the timing advance value.

When the receiver 903 receives the timing advance value or the processor 901 determines the timing advance value and the processor 901 determines that the access is successful, the processor 901 is further configured to set a time alarm of a timing alignment timer to be infinite.

When the receiver 903 receives the timing advance value or the processor 901 determines the timing advance value and the processor 901 determines that the access is successful, the processor 901 is further configured to begin to time and control to implement a process of receiving or determining the timing advance value again when timing reaches the time alarm and the timing advance value is not received or determined again.

The processor 901 is further configured to begin to time or count when the sender 902 sends the access request to the base station.

When timing or counting of the processor 901 reaches a preset threshold and the receiver 903 does not receive the access feedback sent by the base station aiming at the access request, the processor 901 is further configured to control to repeatedly implement a process of obtaining the first synchronous channel resource and a process of using the first synchronous channel resource to send the access request to the base station, or repeatedly implement a process of using the first synchronous channel resource to send the access request to the base station, until the receiver 903 receives the access feedback or sending times of the access request reach a preset maximum number.

The processor 901 is further configured to begin to time or count when the sender 902 sends the uplink message to the base station.

When timing or counting of the processor 901 reaches the preset threshold and the receiver 903 does not receive the competition solution message sent by the base station aiming at the uplink message, the processor 901 is further configured to control to repeatedly implement a process of obtaining the first synchronous channel resource and a process of using the first synchronous channel resource to send the access request to the base station, or repeatedly implement a process of using the first synchronous channel resource to send the access request to the base station, until the processor 901 determines that the access is successful or sending times of the access request reach a preset maximum number.

According to the user equipment as shown in FIG. 9, when the user equipment implements access, the user equipment uses the synchronous channel resource for accessing. In this way, occupation of the user equipment on an access resource during access may be reduced, and utilization efficiency of the access resource is improved.

Figure 10:
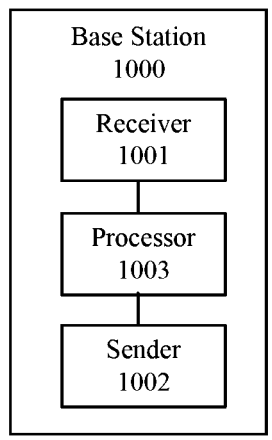
FIG. 10 is a schematic block diagram of a base station provided by another embodiment of the present invention.

FIG. 10 is a schematic block diagram of a base station provided by another embodiment of the present invention. The base station may be used for achieving the above-mentioned method embodiment, and the base station 1000 includes a receiver 1001, a sender 1002 and a processor 1003.

The receiver 1001 is configured to receive an access request sent by a user equipment by using a first synchronous channel resource;

the sender 1002 is configured to send access feedback to the user equipment, for enabling the user equipment to determine whether access is successful according to the access feedback.

The sender 1002 is further configured to send the first synchronous channel resource to the user equipment, wherein the base station 1000 further includes the processor 1003, configured to allocate a synchronous channel resource to the user equipment to serve as the first synchronous channel resource; or, the sender 1002 is further configured to send a synchronous channel resource set to the user equipment, for enabling the user equipment to select the first synchronous channel resource from the synchronous channel resource set, and use the first synchronous channel resource to send the access request, wherein the synchronous channel resource set includes at least one synchronous channel resource.

The sender 1002 is further configured to send a synchronous channel resource set to the user equipment before sending the first synchronous channel resource to the user equipment, wherein the synchronous channel resource set includes at least one synchronous channel resource.

The sender 1002 is specifically configured to send the synchronous channel resource set to the user equipment according to system load.

When the sender 1002 sends the synchronous channel resource set to the user equipment, the receiver 1001 is further configured to receive an uplink message sent by the user equipment according to the access feedback; the sender 1002 is further configured to send a competition solution message to the user equipment aiming at the uplink message, for enabling the user equipment to determine whether the access is successful according to the competition solution message.

The sender 1002 is further configured to send triggering access notification to the user equipment.

When the access feedback is sent to the user equipment, the sender 1002 is further configured to mask the access feedback by using time and frequency information of the access request sent by the user equipment or mask the access feedback by using a wireless side identifier allocated by the process 1003 to the user equipment.

The sender 1002 is further configured to send a timing advance value to the user equipment, for enabling the user equipment to perform uplink transmission according to the timing advance value; or the sender 1002 is further configured to send a timing advance rule to the user equipment, for enabling the user equipment to determine the timing advance value according to the timing advance rule and system information, wherein the timing advance rule is used for indicating a corresponding relationship of the system information and the timing advance value.

The sender 1002 is further configured to send a time alarm to the user equipment, for enabling the user equipment to set a time alarm according to the time alarm for timing.

Those of ordinary skills in the art may be aware that, units and algorithm steps of the examples described in the embodiments disclosed in this paper may be implemented by electronic hardware or a combination of computer software and electronic hardware. Whether these functions are implemented in the form of hardware or software is determined by specific applications and design constraint conditions of the technical solutions. Those skilled may implement the described functions by using different methods for each specific application, but this implementation should not be considered to be beyond the scope of the present invention.

Those skilled in the art to which the present invention pertains may clearly understand that, for convenience and concision of description, the specific working processes of the system, apparatus and units described above may refer to corresponding processes in the foregoing method embodiments, and will not be repeated redundantly herein.

In several embodiments provided in the application, it should be understood that, the disclosed system, apparatus and method may be implemented in other manners. For example, the apparatus embodiments described above are merely exemplary, e.g., the division of the units is only a logic function division, other division manners may exist in practical implementation, for example, multiple units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on multiple network units. A part of or all of the units may be selected to realize the purposes of the technical solutions in the embodiments according to actual demand.

In addition, the functional units in the embodiments of the present invention may be integrated in a processing unit, or the units may singly exist physically, or two or more units are integrated in one unit.

If the function is implemented in the form of a software functional unit and is sold or used as an independent product, it may be stored in a computer readable storage medium. Based on this understanding, the technical solutions of the present invention substantially, or the part contributing to the prior art, or a part of the technical solutions may be implemented in the form of a software product, the computer software product is stored in a storage medium, and includes multiple instructions for enabling a computer device (may be a personnel computer, a server, or a network device, etc.) or a processor (processor) to execute all or part of the steps of the methods in the embodiments of the present invention. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

The foregoing descriptions are merely specific embodiments of the present invention, rather than limiting the protection scope of the present invention. Any skilled person who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. An accessing method, comprising:
    receiving, by a user equipment (UE), a synchronous channel resource set sent by a base station, wherein the synchronous channel resource set comprises information of at least one synchronous channel resource;

selecting, by the UE, a first synchronous channel resource from the synchronous channel resource set;

sending, by the UE, an access request to the base station using the first synchronous channel resource to request to access the base station;

receiving, by the UE, access feedback from the base station; and determining, by the UE, whether access is successful according to the access feedback;

wherein before sending the access request to the base station, the method further comprises:

obtaining, by the UE, a timing advance rule and system information, and determining a timing advance value according to the timing advance rule and the system information, for performing uplink transmission according to the timing advance value, wherein the timing advance rule is used for indicating a corresponding relationship of the system information and the timing advance value.

2. The method according to claim 1, wherein sending the access request to the base station using the first synchronous channel resource, further comprises:

sending the access request to the base station using the first synchronous channel resource, when uplink data is being sent.

3. The method according to claim 1, wherein before sending the access request to the base station, the method further comprises:

receiving, by the receiver, a timing advance value sent by the base station, for performing uplink transmission according to the timing advance value.

4. The method according to claim 1, wherein when timing or counting of the sender sending the access request to the base station by the processor reaches a preset threshold and an access feedback sent by the base station is not received, repeatedly implementing a process of the above obtaining the first synchronous channel resource and sending the access request to the base station using the first synchronous channel resource.

5. The method according to claim 1, wherein the synchronous channel resource comprises a scheduling request resource.

6. The method according to claim 1, wherein when timing or counting of the sender sending the access request to the base station by the processor reaches a preset threshold and an access feedback sent by the base station is not received, repeatedly implementing sending the access request to the base station using the first synchronous channel resource, until the access feedback is received or sending times of the access request reach a preset maximum number.

7. A user equipment, comprising:

a receiver, configured to receive a synchronous channel resource set sent by a base station, wherein the synchronous channel resource set comprises information of at least one synchronous channel resource;

a processor, configured to select a first synchronous channel resource from the synchronous channel resource set;

a sender, configured to send an access request to the base station using the first synchronous channel resource; and the receiver is further configured to receive access feedback from the base station;

wherein the processor is further configured to determine whether access is successful according to the access feedback;

the processor is further configured to obtain a timing advance rule and system information, and determine a timing advance value according to the timing advance rule and the system information, for performing uplink transmission according to the timing advance value, wherein the timing advance rule is used for indicating a corresponding relationship of the system information and the timing advance value.

8. The user equipment according to claim 7, wherein the sender is further configured to send the access request to the base station using the first synchronous channel resource, when uplink data is being sent or when the receiver receives triggering access notification sent by the base station.

9. The user equipment according to claim 7, wherein before the sender sends the access request to the base station, the receiver is further configured to receive a timing advance value sent by the base station.

10. The user equipment according to claim 7, wherein the processor is further configured to begin to time or count when the sender sends the access request to the base station;

when timing or counting of the processor reaches a preset threshold and the receiver does not receive the access feedback sent by the base station, the processor is further configured to repeatedly implement a process of the obtaining the first synchronous channel resource and sending an access request to the base station using the first synchronous channel resource.

11. The user equipment according to claim 7, wherein the processor is further configured to begin to time or count when the sender sends the access request to the base station;

when timing or counting of the processor reaches a preset threshold and the receiver does not receive the access feedback sent by the base station, the processor is further configured to repeatedly implement sending the access request to the base station using the first synchronous channel resource, until the receiver receives the access feedback or the sending times of the access request reach a preset maximum number.

12. A base station, comprising:

a sender, configured to send a synchronous channel resource set to a user equipment, for enabling the user equipment to select a first synchronous channel resource from the synchronous channel resource set, wherein the synchronous channel resource set comprises information of at least one synchronous channel resource;

a receiver, configured to receive an access request sent by the user equipment using the first synchronous channel resource; and the sender is further configured to send access feedback to the user equipment, to enable the user equipment to determine whether access is successful according to the access feedback;

the sender is further configured to send a timing advance rule to the UE, for enabling the UE to determine the timing advance value according to the timing advance rule and system information, wherein the timing advance rule is used for indicating a corresponding relationship of the system information and the timing advance value.

13. The base station according to claim 12, wherein the sender is further configured to send a timing advance value to the user equipment, to enable the user equipment to perform uplink transmission according to the timing advance value.

* * * * *